March 3, 1942.  H. O. DUERR ET AL  2,274,780
REFUSE AND WASTE INCINERATOR
Filed April 11, 1938    3 Sheets-Sheet 1
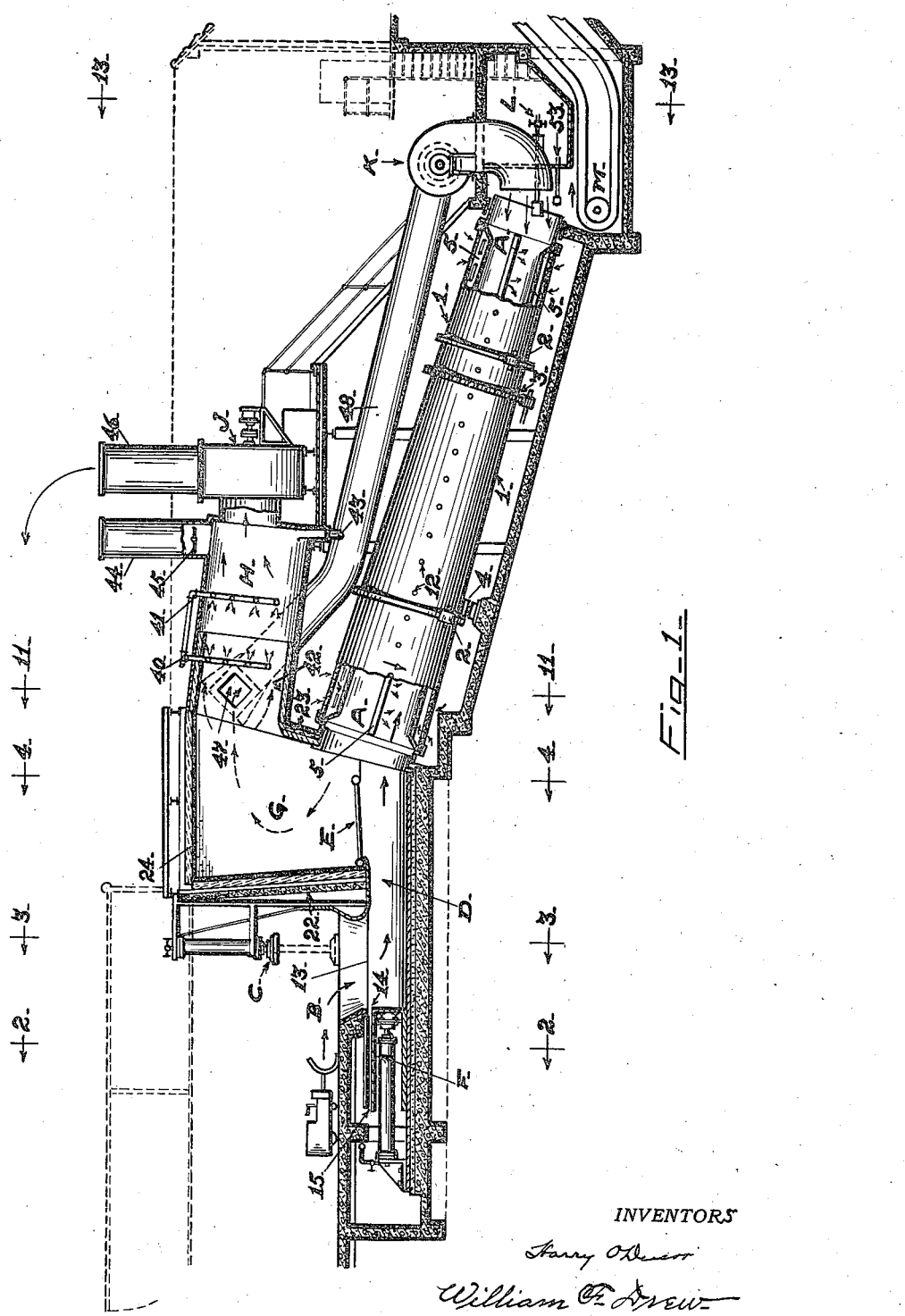
INVENTORS
Harry O. Duerr
William F. Drew

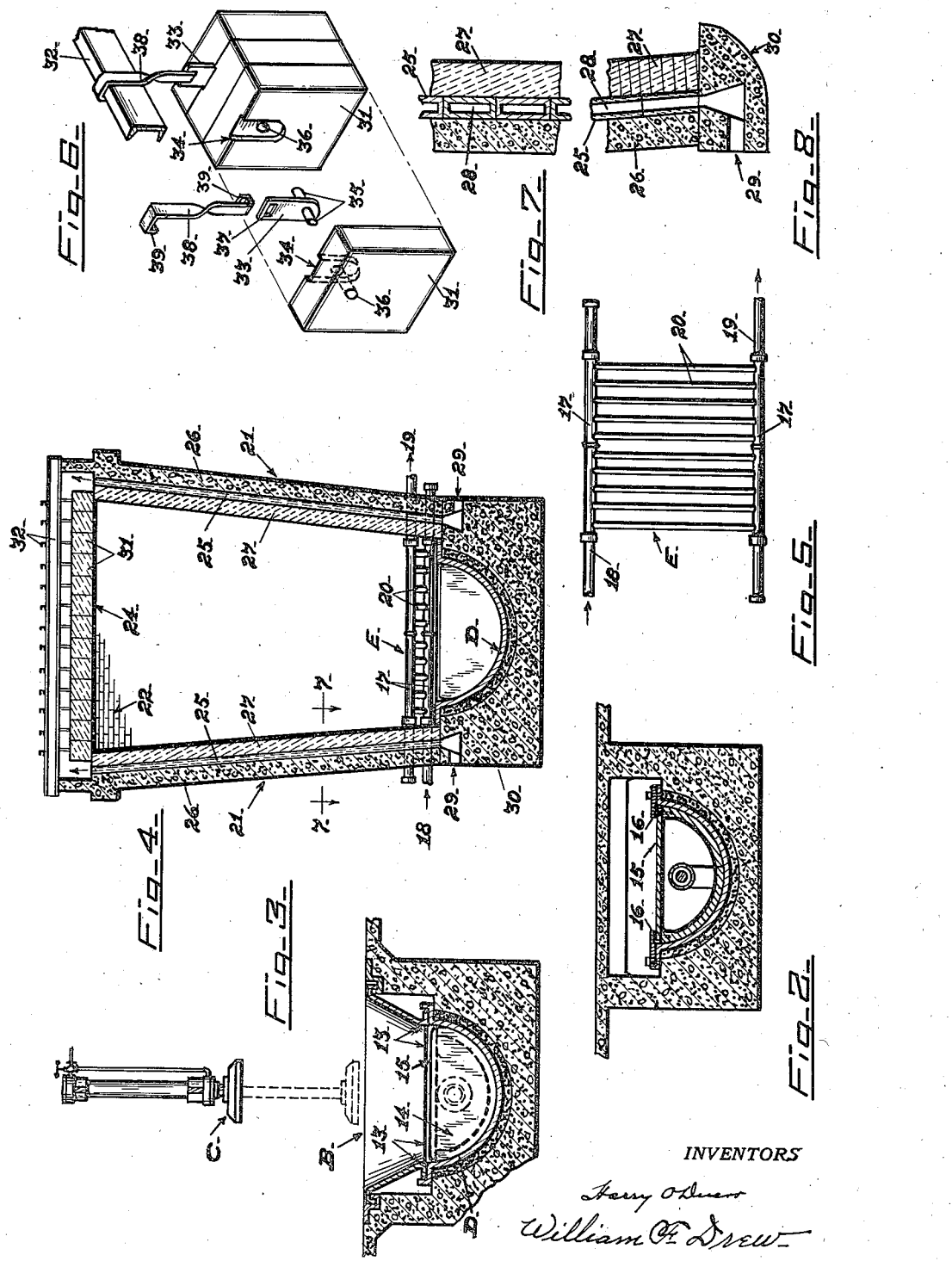

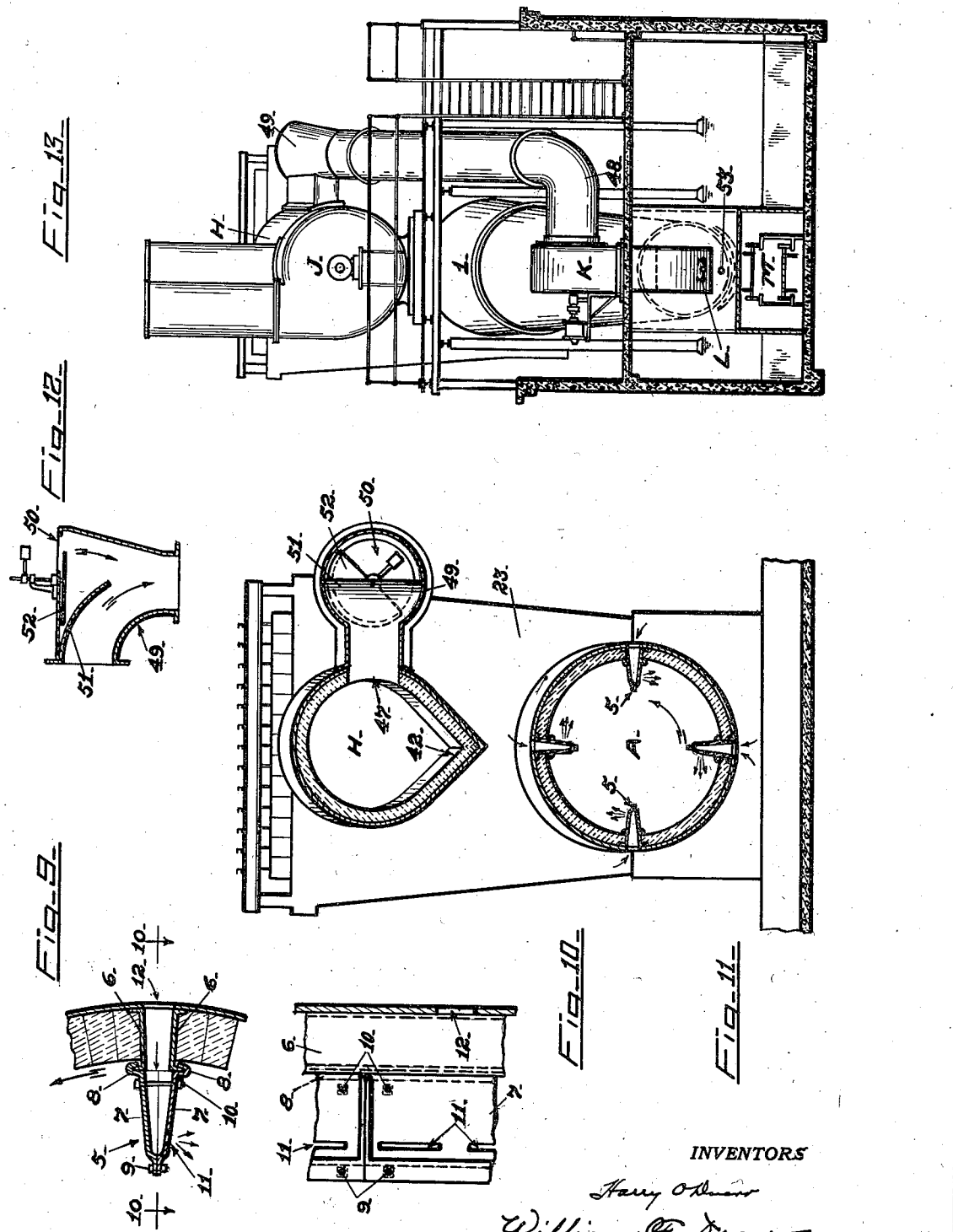

Patented Mar. 3, 1942

2,274,780

UNITED STATES PATENT OFFICE 2,274,780

REFUSE AND WASTE INCINERATOR

Harry O. Duerr and William F. Drew,
Los Angeles, Calif.

Application April 11, 1938, Serial No. 201,356

7 Claims. (Cl. 110—14)

This invention relates to and has for an object the provision of an improved incinerator unit wherein primary and secondary combustion chambers, an exhauster and a blower for creating forced drafts, and collateral devices, parts and elements, are so constructed, relatively arranged, co-related, and operated, as to make possible a comparatively quick and thorough incineration disposal of large quantities of waste and refuse matter without objectionable discharge of ashes, dust and gaseous fumes into the atmosphere, or the creation of putrescent or voluminous residual matter resulting from combustion failure.

An important object is to provide an incinerator unit of the character described wherein the efficacy of the equipment is materially increased through the use of primary and secondary combustion chambers, an exhauster and a blower, in a novel arrangement such that a push-pull draft effect is created throughout said chambers to effectually support combustion, and air commingled with heated gases of combustion is charged into the primary chamber by said blower to further aid combustion.

A further object is to provide an incinerator such as described wherein added incineration efficiency is achieved through the instrumentality of an inclined, rotary, primary combustion chamber which is of gradually decreased diameter towards its lower end and equipped with novel means having the threefold function of simultaneously agitating the mass of matter in said chamber by lifting, dropping and advancing such mass throughout the length of the chamber; aerating the mass, and introducing air to support combustion at spaced points throughout said agitated mass.

Yet another but none the less important object is to provide an incinerator unit wherein the combustion chambers and associated parts, especially the secondary combustion chamber, are constructed in a new and improved manner to effectively withstand the ordinarily destructive heat created therein and to give long service without repair, the walls of this chamber being air cooled and insulated in a novel manner and the roof thereof being of a flat arch type and embodying important structural and heat resisting features, all for the purpose of increasing the life and reducing the maintenance and operating costs of the apparatus as a whole.

With the above and other objects in view the invention consists in the novel construction and combination of parts hereinafter described, illustrated in the accompanying drawings, and set forth in the claims hereto appended, it being understood that various changes in form, proportion, size and minor details of construction within the scope of the claims may be resorted to without departing from the spirit or sacrificing any of the advantages of the invention.

Referring to the drawings:

Figure 1 is a side elevation partly in section of the incinerator unit constructed in accordance with this invention.

Figure 2 is a cross section taken on the plane of line 2—2 of Figure 1.

Figure 3 is a cross section taken on the plane of line 3—3 of Figure 1.

Figure 4 is a sectional view taken on the plane of line 4—4 of Figure 1.

Figure 5 is a top plan view of the water cooled baffle.

Figure 6 is a perspective view of a section of the flat arch ceiling of the secondary combustion chamber with parts separated for clarity of illustration.

Figure 7 is a fragmentary horizontal section taken on the plane of line 7—7 of Figure 4, showing the construction of the thermally insulated air cooled sides of the secondary combustion chamber.

Figure 8 is an enlarged fragmentary section showing cooling air intake for the sides of the secondary combustion chamber.

Figure 9 is an enlarged fragmentary section taken through the shell of the primary combustion chamber and showing the construction of the lifting vanes therein.

Figure 10 is an enlarged fragmentary sectional view on line 10—10 of Figure 9.

Figure 11 is an enlarged section taken on the plane of line 11—11 of Figure 1.

Figure 12 is an enlarged horizontal section of the intake elbow for heated air and atmospheric air.

Figure 13 is a sectional view taken on the plane of line 13—13 of Figure 1.

As shown in the accompanying drawings one form of the incinerator of this invention generally comprises a rotary primary combustion chamber A which is inclined and gradually reduced in diameter towards its lower end; a waste and refuse bin B; a tamper C, a chamber or bin extension D contiguous with the upper end of the primary chamber, a baffle grating E coacting with the bin extension to guide the waste into the primary chamber; a feed means F operating in said bin to push waste and refuse into said chamber; a stationary secondary combustion chamber G contiguous with the upper end of said primary chamber for receiving and burning combustible gases delivered from the primary chamber, a spray chamber H formed as a continuation of the secondary chamber, an exhauster J for inducing a flow of gaseous fluid (air and combustible gases) successively through said primary, secondary and spray chambers, a blower K for forcibly introducing into the lower end of the primary chamber, air commingled with and heated by gases from said secondary chamber, a burner L for starting combustion in said primary chamber; and a conveyor M for removing ashes and non-combustible matter discharged from the primary chamber.

In accordance with this invention the waste and refuse matter is continuously fed into the upper end of the rotating primary combustion chamber at a rate, in consideration of the capacity, degree of inclination, and combustion rate of said chamber, such that the mass of said matter being incinerated will form a continuous bed throughout the length of the chamber, with said bed proportionally reduced in volume towards the lower end thereof. Inasmuch as the chamber is conical and therefor gradually reduced in diameter towards its lower end, there will be continuously created in the chamber, a combined air-to-support-combustion and flue passage which is also decreased gradually in area towards the lower end of the chamber in proportion to the decrease in capacity of the chamber proportional to the decrease in bulk of the mass of matter being incinerated therein. This provides for the proper ratio of combustion supporting space to the bulk of the mass at all points throughout the chamber whereby a thorough combustion of the mass will take place throughout the entire length of said chamber.

We have found that the efficiency of the incinerator is materially increased by the use of the secondary combustion chamber for consuming combustible gases discharged from the upper end of the primary chamber, and by creating a "push-pull" draft through said chambers by means of the exhauster J and K, and especially where the latter is arranged to take off heated gas from the secondary chamber and combine the same with atmospheric air, then forcibly blowing the thus heated gas and air mixture into the lower end of the primary chamber. Furthermore, we have found that by agitating the matter in the primary chamber simultaneously and throughout the mass of such matter during its movement through the progressively decreased volume zones of the primary chamber A, while at the same time introducing secondary air to support combustion at spaced points throughout said chamber, a more thorough combustion will be attained.

These and other factors resulting from the constructional arrangement of the primary and secondary chambers and elements hereof, some of which will be hereinafter more fully described, make possible an incinerator of greater efficiency than those heretofore used, as will be apparent as this description progresses.

As here shown the primary chamber A is defined by a refractory lined tapered shell 1 open at both ends. This shell is rotatably supported in inclined position with its larger end uppermost, by means of a conventional supporting structure, portions of which are shown at 2. A suitable drive means shown at 3 is employed to rotate the shell, and a conventional form of anti-friction device 4 engages the shell structure to prevent longitudinal shifting thereof.

Means are provided for lifting, turning over and dropping portions of the mass of matter during rotation of the shell and may take the form of the hollow vanes 5 extending substantially the full length of said shell. Each of these vanes is made up of a pair of spaced channels 6, Figures 9 and 10, fixed to the shell and supporting a pair of elongated and spaced plates 7 which are longitudinally hooked around the flanges of the channels as at 8 and secured together by the fastenings 9 and 10 so that the outer edges thereof come together. These vanes are provided with outlet openings 11 at spaced points therealong whereby atmospheric air entering the hollow spaces thereof through a series of openings 12 in the shell, will be introduced into the chamber to aerate the mass and support combustion of the matter being incinerated. It should be noted that the "draft" forces created in the primary combustion chamber by the exhauster J will induce a steady flow of atmospheric air through the hollow vanes 5 while the latter are agitating the bed of matter therein. This induction of "fresh" air will insure air admixture throughout the chamber and more especially provide a complemental air supply in intimate aerative contact with the "bed" of matter being incinerated.

The bin B for receiving waste and refuse matter is extended and prolonged by the extension D and the discharge end thereof is contiguous with the lower half of the upper end of the shell 1 forming the primary combustion chamber. As particularly shown in Figures 2 and 3 this bin extension is substantially semi-circular in cross section and connected to the bin B to form an inlet opening or mouth 13. As seen in Figure 1 a bull-dozer may be employed to push waste and refuse matter deposited on the "dumping" floor into the bin or hopper B. To insure adequate feeding of materials such as waste or the like which are bulky, full of voids and resilient in some degree; the tamping device C is suitably mounted above the bin or hopper B to compress material therein when desirable. As illustrated the tamper C is one of the conventional forms of hydraulically or pneumatically operated plunger devices having suitable controls for manual operation.

The feed means F comprises a hydraulically or otherwise operated plunger 14 which as shown in Figures 1, 2 and 3 is substantially of the same cross sectional shape as the bin extension D so that when pushed from its normal position to one side of the mouth 13 it will force the waste and refuse matter through the bin extension D into the upper end of chamber A. It is noted that the plunger 14 is relatively long and has a working fit with the bin extension chamber walls and is provided with an upper surface 15 adapted to close the opening or mouth 13 of the bin B during the stroke movement of the plunger. The plunger is held in place by the overlying flanges 16 as shown in Figure 2, whereby it will be guided to withstand the forces and pressures set up when pushing large quantities of matter into the primary chamber.

The construction and arrangement of the secondary combustion chamber G is an important factor making for added efficiency of the incinerator. It is seen in Figure 1 that the lower end of this chamber registers with the upper half of the intake end of the primary chamber A and is in full communication with the forward portion of the bin extension D. This is necessary firstly, to provide for the immediate discharge of gases from chamber A to chamber G and secondly to cause particles of solids and ashes resulting from incineration in the primary chamber and carried by the forced draft therein into the secondary chamber to drop down upon the materials being fed into the primary combustion chamber and thus be returned to the primary chamber for discharge from the system. This scavenging conveyance of the ashes etc. is effected by the provision of the grate-like baffle E through the "grate" openings of which the ash etc. is deposited for automatic discharge from the chamber G. Further, in order to prevent the waste matter from passing from the bin extension C upwardly into the chamber G and permit of the scavenging of ashes from the chamber G as described, the grate-like baffle E is extended substantially over the full area of communication between the chamber G with the bin extension D. As particularly shown in Figure 5, the baffle E is water cooled and consists of header tubes 17 connected to water feed and discharge lines 18 and 19 and having a plurality of spaced water tubes 20 extended therebetween, like the bars of a grate. It is thus seen that said baffle will act as a grate to support any burning matter which may be blown onto it from the upper end of the primary chamber A and provide for scavenging the ashes resulting from this secondary combustion in the same manner as above described.

As shown in Figures 1 and 4 the secondary chamber G is made up of side walls 21, and walls 22 and 23 and flat arch or roof 24 arranged so that said chamber is of generally square cross section. The side and end walls are thermally insulated by hollow tile tiers of courses 25, Figs. 4, 7 and 8, between an outer wall 26 constructed of concrete or brick and an inner wall 27 formed of courses of refractory material such as brick or blocks "laid up" without a binder. This method of "loose laying" of the refractory permits free expansion and contraction of the lining without disruption, the walls so constructed having an inclination outwardly whereby to maintain stability of the component parts. The said hollow tiles form upright air passages 28 whereby atmospheric air may continuously pass through the walls from the intake passages 29 formed in the foundation 30 on which said walls are erected. The passages 28 open to the atmosphere at the upper ends of the walls as shown in Figure 4.

The flat arch 24 is made up of a plurality of refractory slabs or blocks 31 suspended from frame members 32 supported by the side and end walls of the chamber. These slabs or blocks are set up face to face and edge to edge so as to form a "tiled" and relatively thick roof or flat arch, capable of better withstanding heat than any other arch of which we are aware. No cement or the like is used, but the slabs or blocks are interlocked and suspended by plates 33 which fit in complementary recesses 34 in opposed faces thereof. These plates have pin ends 35 extending from opposite sides thereof into sockets or holes 36 formed in said faces. This is particularly shown in Figure 6 wherein it is also seen that the plates 33 extend above the blocks and have apertures 37 in said extended portions. Twisted straps 38 having hook ends 39 serve as hangers for suspending the blocks from the frame members 32.

The spray chamber H is formed as a continuation or flue portion of the secondary chamber G and has suitable spray units 40 and 41 for water, steam or other suitable fluids. These units face one another in the chamber whereby to set up agitating and eddy current and effectively wet down the gases of combustion passing therethrough so as to cause a precipitation of the fine ashes, dust, etc. from said gases. It is seen that the precipitated matter and water or slime formed in the chamber H will drain on the inclined bottom 42 and out through a sewer or other disposal connected drain 43. A chimney or flue 44 is connected with the chamber H and has a damper 45 therein whereby to vent the gases of combustion when a natural draft is relied upon, in contradistinction to passage of the gases out through the exhauster J which latter is provided with a similar flue 46.

The exhauster J is connected with the outer end of the chamber H and operates to induce a draft through the primary, secondary and spray chambers. It may be of any suitable form provided it will create a strong draft as aforesaid that exceeds the draft producing force of the blower K, especially as to the secondary chamber G and spray chamber H.

The blower K is set up and operated so that it will exhaust gases from the secondary chamber through an opening 47 and conduit 48 and then forcibly discharge said gases into the lower end of the primary chamber A. The shell of the spray chamber H is constructed of steel to insure retention of water and slime but to prevent deterioration of the shell from the effects of heat; yet insure a "take off" of hot gases by the blower K to occur prior to the act of spraying and cooling, the first portion of the chamber is lined with refractories.

As shown in Figures 11, 12 and 13 an elbow 49 connects the conduit 48 with the opening 47 and is provided with an atmospheric air intake opening 50 and a curved baffle 51, and an air inlet shutter 52. This shutter provides for controlling the admission of air and may be manually or automatically regulated. The baffle 51 directs the hot gas from chamber G in such manner that the atmospheric air is entrained with said gases and is thereby heated. Thus it is seen that the blower K directs a continuous blast of hot air and gas into the lower end of the primary chamber A so as to aid in the support of combustion of the matter therein.

It should be noted that the capacity of the exhauster J exceeds the draft producing volume and force of the blower K together with the gases produced by the process of incineration, so as to insure the proper draft throughout the incinerator, yet the "draft" produced by the blower K is necessary as a booster, and the resultant "push-pull" effect, as experiments and actual tests have proven, will provide for a better incinerating action than is had where but one of these two draft creating units is used. For essentially, aside from its function of providing heated air for combustion, the air blast from the blower K revives, holds in suspension in the combustion chamber and maintains combustion of cinders that would otherwise be discharged unburned. Further, in proportion to the force of the blast employed a proportional quantity of "fines" resulting from primary incineration are carried back and distributed throughout the lower portion of the chamber for complemental incineration. However, while a proportional quantity of actual ash is also returned in the combustion chamber by the air blast, a condition of proportional discharge is established and tests have proven that by this means the combustible content of matter finally discharged is less than five per cent of the residue of incineration by the means of this invention.

With reference to Figures 1 and 13 it is seen that the discharge end of the blower K and high pressure blast nozzle 53 are disposed in close proximity to the lower end of the primary combustion chamber and positioned so that a gaseous fluid blast from either or both may be discharged directly onto the floor or lower side of said chamber just inside the lower open end thereof and thereby deflected upwardly from said side towards the upper end of the chamber. This blast of gaseous fluid segregates and returns the lighter portions of the mass upwardly in the chamber, so that the cinders and other combustibles are thereby reignited, consumed and add an otherwise lost heat content to the incinerating process. Such heat conservation eliminates, under average conditions, the necessity of using supplemental heat from a separate source, such as the burner L or any auxiliary burner or heater at the lower end of the chamber.

It should be noted that in having the blast of gaseous fluid discharged toward the floor of the chamber at the lower end thereof as aforesaid, the lighter portions of the mass are recovered and carried upwardly due to the upward deflection of said blast upon encountering the floor of the chamber, and thereby kindled and reignited, while the heavy non-combustible portion, such as tin cans, metal particles, etc. are free to discharge. The discharge ends of the blower K and nozzle 53 are therefore spaced outwardly from the lower end of the chamber just sufficiently to permit of such free discharge of the non-combustible matter, inasmuch as the closer these discharge ends are disposed to the floor at the lower end of the chamber, the more forceful and efficient the blast component of our process becomes.

To be used at the discretion of the operator or in the event of abnormal conditions of incineration, a high pressure air blast jet or nozzle 53, Figures 1 and 13, (supplied from a suitable source not shown) is provided to agitate and blow back into the combustion chamber, requisite quantities of material for complemental treatment.

The conveyor M is arranged in any suitable manner so as to continuously remove ashes and non-combustible matter discharging from the lower end of the chamber A.

It is now apparent that this invention also embraces a new incineration method which is characterized by the creation of primary and secondary combustion zones contiguously related; continuously feeding waste and refuse matter into the primary zone at its juncture with said secondary zone, to the exclusion of feeding such matter to the latter, applying an exhausting force to the discharge end of the secondary zone to create a draft through both zones, continuously burning the mass of matter in the primary zone, while also continuously burning the gases of combustion from the secondary zone and then introducing said heated gases and atmospheric air into said primary zone.

The method further includes the step of continuously discharging gaseous products of combustion into the atmosphere from the secondary chamber, and spraying the gases of combustion before such discharge to cause precipitation of dust and ash particles. Moreover, the method includes the step of agitating, and aerating the mass of matter in the primary combustion zone while at the same time introducing air to support combustion at various points throughout said zone, together with such other steps as may be set forth in the preceding portions of this specification.

We claim:

1. In an incinerator, an inclined rotary primary combustion chamber, a secondary combustion chamber, said primary combustion chamber being reduced in diameter towards its lower end and having its upper end in registration with the lower end of said secondary chamber, and a spray chamber connected to the upper end of the secondary chamber, means for feeding waste and refuse matter into the upper end of said primary chamber while maintaining the normal registration of said secondary and primary chambers, an exhaust fan connected with said spray chamber for creating a continuous forced draft through all of said chambers, and a blower for continuously discharging gaseous fluid toward the floor of the primary combustion chamber at the lower end thereof so as to blow back up into the chamber and hold in suspension for reignition and combustion the lighter particles of said matter.

2. In an incinerator, an inclined rotary primary combustion chamber, a secondary combustion chamber in registration with the upper end of the said primary chamber, and means for feeding waste and refuse matter into the upper end of said primary chamber while maintaining the normal registration of said secondary and primary chambers, a skeleton baffle member constructed and disposed to act as a guide to prevent the introduction of waste and refuse matter by said feed means into the secondary chamber and as a screen to permit ashes and matter arising from said primary chamber to sift through to said feed means or be supported and consumed on said baffle.

3. In an incinerator, an inclined rotary primary combustion chamber, a secondary combustion chamber in registration with the upper end of the said primary chamber, and means for feeding waste and refuse matter into the upper end of said primary chamber while maintaining the normal registration of said secondary and primary chambers, a skeleton baffle member constructed and disposed to act as a guide to prevent the introduction of waste and refuse matter by said feed means into the secondary chamber and as a screen to permit ashes and matter arising from said primary chamber to sift through to said feed means or be supported and consumed on said baffle, and means for water cooling said baffle including tubular portions forming parts of the baffle and acting as water cooled tubes.

4. In an incinerator, an elongated, tubular, rotary, inclined shell defining a combustion chamber having a plurality of air intake openings arranged in longitudinal series in the tubular wall thereof, and a plurality of vanes secured to and extending lengthwise of said shell interiorly thereof and being hollow and perforated for introducing air from said intake openings into said chamber.

5. In an incinerator, an elongated, tubular, rotary and inclined shell defining a combustion chamber provided with a plurality of rows of air intake openings lengthwise thereof, and a plurality of hollow vanes secured to and extending lengthwise of said shell interiorly thereof for agitating refuse and waste matter contained in said chamber, said vanes having the hollow spaces thereof in registration with said air intake openings and being provided with a plurality of longitudinal rows of air outlet openings on certain sides thereof for introducing air into the chamber substantially throughout the length of the vanes.

6. In an incinerator, a primary combustion chamber, a secondary combustion chamber contiguous and registered with one end of said primary chamber, a feed bin having an extension registering with said one end of said primary chamber, a feed bin mouth through which waste and refuse matter is fed to said extension, a tamping plunger for forcing waste and refuse matter through said bin mouth into said extension, and a feed plunger for forcing waste and refuse matter from said extension into said primary chamber, said secondary chamber having its lower side in registration with said extension, and a grate-like baffle member disposed as a partition between said secondary chamber and said extension to prevent the feed plunger forcing said matter into said secondary chamber.

7. In an incinerator, an inclined rotary combustion chamber into which waste and refuse matter is fed at the upper end thereof, and means for directing toward the floor of said chamber at the lower end thereof a fluid jet of sufficient force and intensity to blow particles of the matter upwardly into the chamber from the floor at said lower end and maintain the same in suspension for reignition and combustion during rotation of the chamber.

HARRY O. DUERR.
WILLIAM F. DREW.